July 17, 1973   L. K. J. EHNSTROM   3,746,550
METHOD OF CONTINUOUS MASHING
Filed Oct. 28, 1971   3 Sheets-Sheet 3

INVENTOR.
LARS KARL JOHAN EHNSTROM
BY
Davis, Hoxie, Faithfull + Hapgood
ATTORNEYS

United States Patent Office 3,746,550
Patented July 17, 1973

3,746,550
METHOD OF CONTINUOUS MASHING
Lars Karl Johan Ehnstrom, Tullinge, Sweden, assignor to Alfa-Laval AB, Tumba, Sweden
Filed Oct. 28, 1971, Ser. No. 193,518
Claims priority, application Sweden, Nov. 3, 1970, 14,807/70
Int. Cl. C12c 7/00
U.S. Cl. 99—51
7 Claims

ABSTRACT OF THE DISCLOSURE

The mash is heated to a predetermined temperature which should be maintained uniformly throughout the mash while it passes through a holding zone where enzymatic reactions take place. For this purpose, the heated mash in the holding zone is caused to flow through a channel having an elongated cross-sectional area and which directs the flow in a helical path around a horizontal axis.

---

Figure 1:
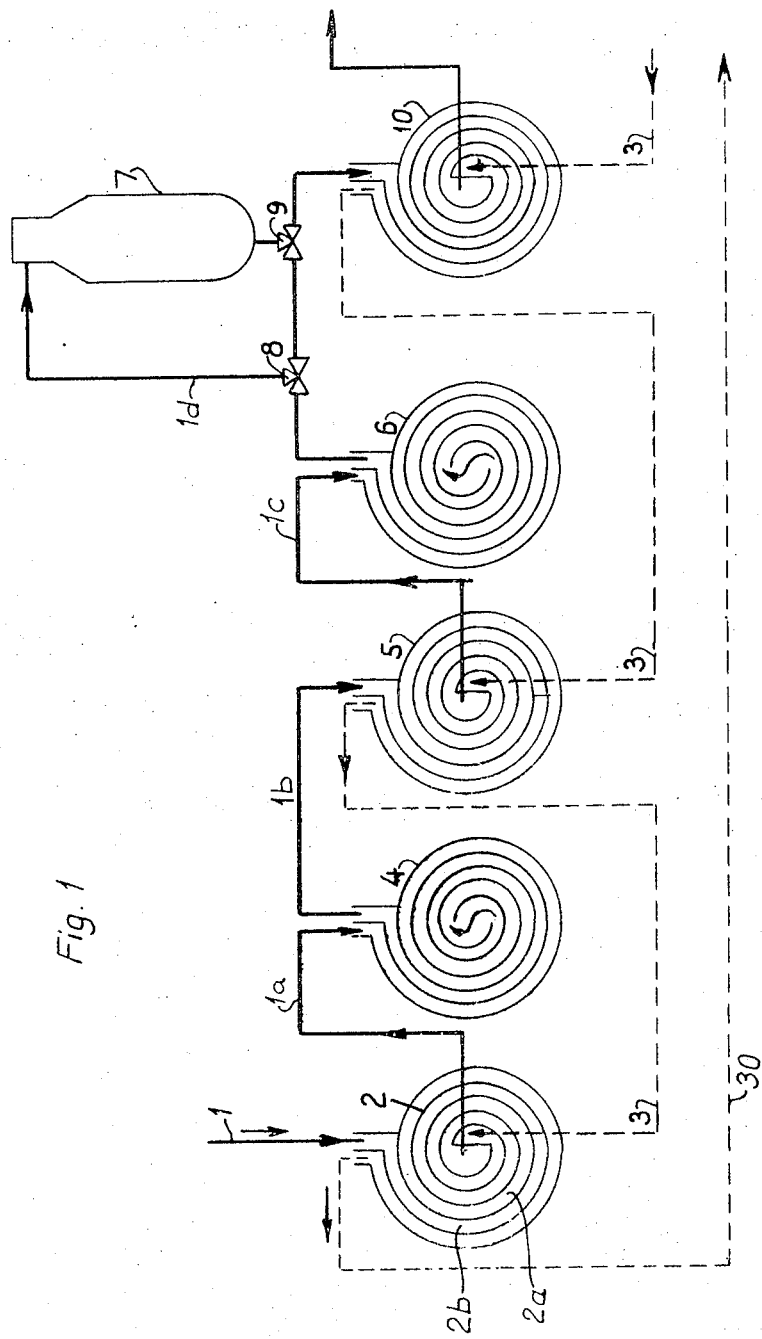

The present invention relates to a method of continuous mashing in connection with micro-biological processes, where the mash is heated to a predetermined temperature which is intended to be maintained uniformly when the mash passes through a mashing stage in which enzymatic reactions take place.

The present trend toward continuous processes in all branches of the fermentation industry has resulted in efforts to effect continuous processing also in a partial process such as the mashing. Mashing implies mainly that a pulverized material containing carbohydrates is leached and that the extracted carbohydrates are broken down to fermentable carbohydrates by enzymes. In order to obtain a satisfactory result, it is necessary to secure certain holding times at certain required temperatures for the mash, so that the above-mentioned reactions can be completed. Heretofore the mashing has been carried out discontinuously in large vessels. When the first efforts were made to accomplish the mashing continuously, the mash was directed through vessels connected in series with an inlet for the mash in the bottom of each vessel and an outlet in the upper part of the vessel. In spite of stirring of the mash in the vessels, the holding time for the separate particles in the mash was not sufficiently uniform, so that the quality of the resulting wort was low.

Swedish Pats. Nos. 213,744 and 221,906 disclose methods of carrying out a continuous mashing. A mixture of grist and liquor is continuously fed to a duct having a transverse dimension and form so selected, in relation to the mixture and its rate of feed, as to cause the mixture to flow as a quiescent plug through the duct. The temperature of the mixture is adjusted by temperature regulating devices outside the duct such as heating jackets surrounding the duct. This method entails the great disadvantage that the duct, in which deposits are often formed, is very difficult to clean and sterilize.

According to the present invention, a method of carrying out a continuous mashing is provided which involves great advantages as regards both the mashing itself and the subsequent cleaning and sterilizing of the apparatus.

The invention is characterized in that the mash in the holding zone is caused to flow through a channel with an elongated cross sectional area, which channel is so arranged that the mash when it flows through the channel follows a path which is helical around a horizontal axis.

The method according to the invention can be performed so that the mash is caused to follow a path which leads first towards the center of the spiral, after which the direction of flow is reversed so that the flow is directed away from the center; or the mash is admitted at the center of the spiral and led towards the outer part of the spiral, after which it is reversed and led to the center. According to a preferred practice of the method, the mash is heated in a spiral heat exchanger.

After the mash has been heated and passed through a channel in a holding zone, it may be heated again and passed through a second holding zone comprising one or more spiral paths connected in series. When the mash has passed the first and the second holding zone, it can also be passed through a holding tube with a variable holding time.

By flowing the mash through a channel arranged in the described manner, a very uniform flow through the channel is obtained, even at relatively low flow rates, whereby a uniform holding time at a required temperature is secured for all particles in the mash. By arranging spacing pins in the channels, the mixing of the mash in the channels can be further increased.

The method according to the invention can be carried out with a high pressure on the liquid, which accelerates the enzymatic reactions occurring during the mashing. The method may be carried out with heating in several steps, each heating step being followed by passage of the mash through a holding zone.

By the method according to the invention, the great advantage is obtained that the degree of pulverizing of the raw material is of no importance, and a finely-ground material as well as a coarsely-ground or a crushed material can be used. The latest research in regard of mashing has shown that a higher degree of finely ground material gives faster enzymatic reactions at the same time as higher yields are obtained, both during the mashing and by the leaching of the solids or spent grains following the mashing. Should the mixture of finely-ground material and water become too viscous, a suitable flow rate can still be obtained by pumping the mixture with a higher inlet pressure into the spiral channel. Unmalted grains, to which enzymes are added at the mashing-in, can also be used.

The new method enables a satisfactory cleaning and sterilizing of the channel through which the mash is led. The channel may be first flushed and then sterilized with steam under pressure at temperatures of 135–140° C.

The whole process, from mashing-in to obtaining the final wort, can be accomplished in apparatus units connected in series. The apparatus units can be made very compact, so that the need of space is small.

A channel of the type used when performing the new method is suitably provided by winding one or more plates in a spiral manner. In order to limit the channels, covers are fastened on both side of the wound spiral. Sealing between the separate channels and the covers is obtained by means of gaskets which are kept in place by the covers. Spacing pins between the plates can help to secure the height (depth) of the channel. The spiral channel has either an inlet at the center of the spiral and an outlet at the outer part of the spiral or an inlet at the outer part and an outlet at the center. It can also have both an inlet and an outlet at the outer part of the spiral or at the center. In this case, the parts of the channel formed by the plates are connected together at the part of the spiral which is opposite to the inlet or outlet, so that the direction of flow is reversed at this place.

The covers which close the sides of the channels of the apparatus are removable, so that the cleaning of the spiral channels is facilitated to a high degree.

Figure 2:
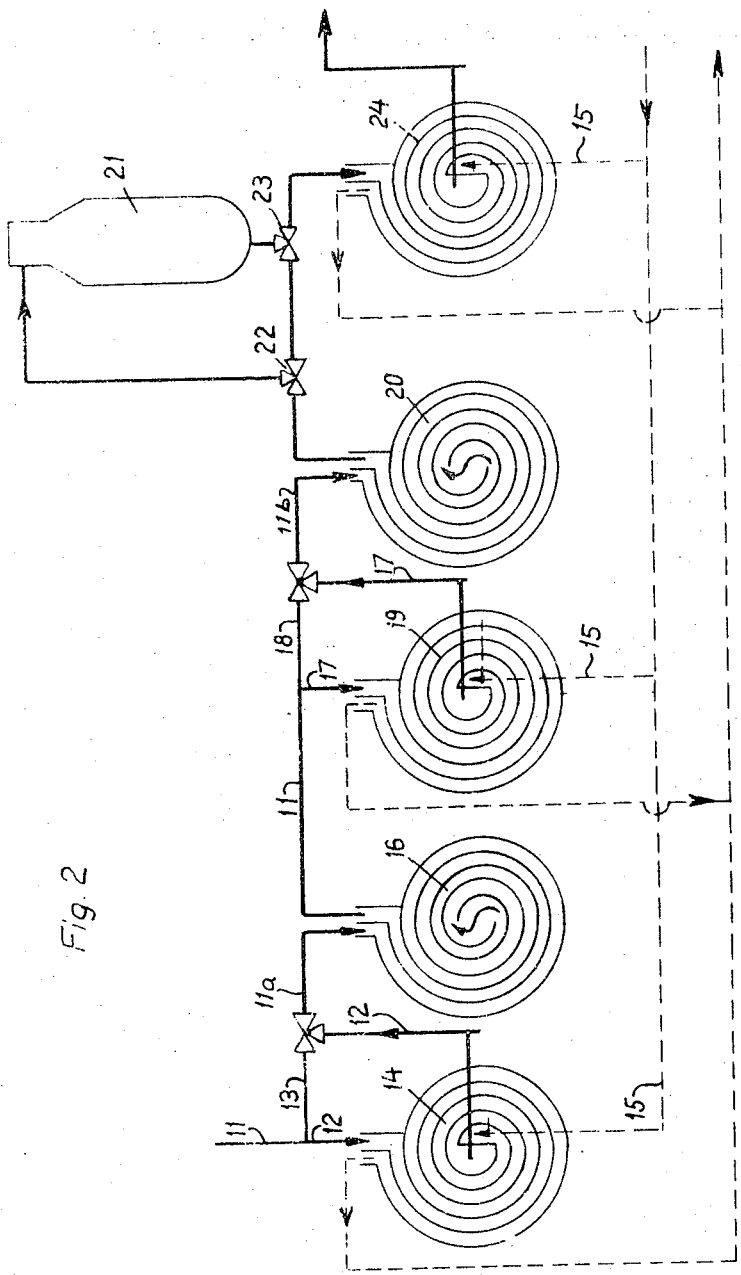

The method according to the invention is illustrated in the drawings by two examples of embodiments which show the operations from mashing-in to separation of solids or spent grains in the production of beer. In the drawings, FIG. 1 is a flow chart showing the mashing according to the so-called infusion method; FIG. 2 is a flow chart showing the mashing according to the so-called decoction method; and FIG. 3 shows schematically, in vertical cross-section, an apparatus comprising spiral channels which is suitable for carrying out the method according to the invention.

As shown at 1, a suspension of finely-ground raw material and water or leachwater, at a temperature of about 35° C., is directed to a spiral heat exchanger 2 where the suspension 1 is heated to a temperature of 45–55° C. by hot water in counterflow. The hot water from supply line 3 flows through the heat exchanger by way of spiral channel 2a and thence to a discharge line 30, while the suspension flows through spiral channel 2b of the exchanger. From the latter, the suspension flows through pipe 1a to a spiral reactor 4, i.e., an apparatus comprising a channel with an elongated cross-sectional area and through which, the suspension flows in a spiral path around a horizontal axis. The apparatus 4 is similar to a spiral heater but is modified so that it has only one outlet and one inlet. In the center of the spiral, the flow direction of the liquid is reversed so that the liquid flows away from the center of the spiral. The spiral reactor 4 constitutes an embodiment of an apparatus suitable for performing the method according to the invention, but other apparatus may be used to provide for flow of the mash in a spiral path around a horizontal axis, which is a characteristic feature of the invention. After its passage through the spiral reactor 4, in which a predetermined holding time is provided, the suspension is directed through pipe 1b to a second spiral heat exchanger 5 in which the suspension is heated by hot water 3 to 60–72°. C. The heated suspension is thereafter directed through pipe 1c to a second spiral reactor 6 in order to be treated at this temperature during a second holding period. Further spiral reactors (not shown) may be connected in series with the spiral reactor 6 in order to increase the holding time. If the saccharification of the mash is not sufficient, a holding tube 7 may be connected to the circuit by way of a three-way valve 8 and pipe 1d so that the suspension is led through this tube. The holding time in the tube 7 can be varied by changing the pressure in the upper part of the holding tube. By way of a second three-way valve 9, the suspension 1 is directed to a spiral heat exchanger 10, in which the suspension is heated to 78° C. by hot water 3 in order to inactivate the enzymes which have been active during the mashing. Thereafter, separation of solids or spent grains takes place and the resulting wort is directed further for additional treatment (not shown).

According to the decoction method (FIG. 2), a suspension 11 of raw material and water, with a temperature of around 35° C., is divided into two fractional flows 12 and 13. The fractional flow 12 is directed to a spiral heat exchanger 14 and is there heated by hot water 15 to a temperature of 95° C. After passage through the heater 14, the fractional flow 12 is reunited with the fraction 13, so that the resulting flow at 11a has a temperature of 45–55° C. In the same way as illustrated in FIG. 1, the suspension is thereafter directed through a spiral reactor 16 where it is held in a flowing state for a predetermined time. The suspension 11 is then divided again into two fractions 17 and 18, the smaller fraction 17 being led through a second spiral heat exchanger 19 and there heated by hot water 15 to a temperature of 95° C. The fraction 17 is then united with the fraction 18 so that the resulting flow at 11b has a temperature of 60–72° C. The suspension flow 11b is directed further to a second spiral reactor 20, from which the suspension may be led through a holding tube 21 by way of two three-way valves 22 and 23. Finally, the suspension is heated by hot water 15 in a spiral heat exchanger 24 to 78° C. in order to inactivate the enzymes. The resulting mash is then directed further for separation of wort (not shown).

Figure 3:
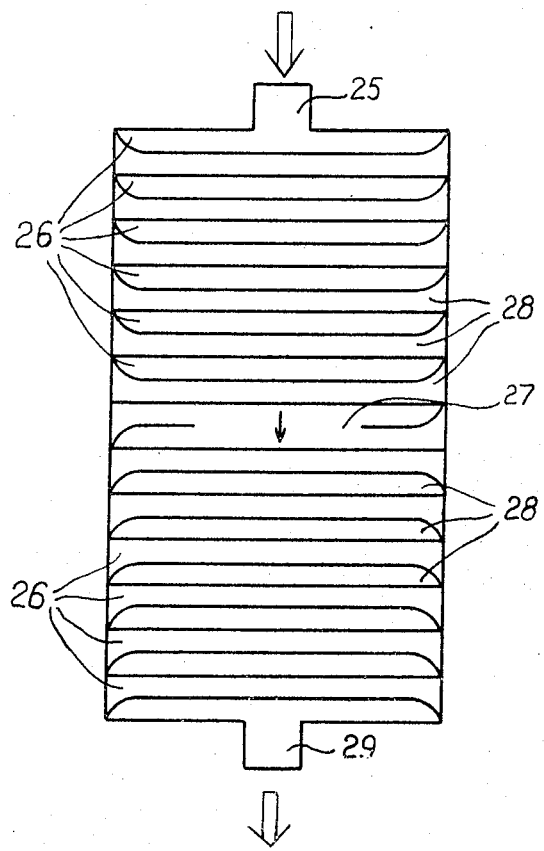

In the spiral reactor as shown schematically in FIG. 3, the mash entering inlet 25 is directed into a channel 26 and flows in a spiral path around a horizontal axis and toward the center 27, where the flow direction is reversed so that the mash then flows through the channel 28 towards the outer part of the spiral and through the outlet 29.

I claim:

1. In a continuous mashing, the method which comprises heating the mash to a predetermined temperature and passing the heated mash through a holding zone while subjecting the mash to enzymatic reactions, said method being characterized in that the mash in said holding zone is directed through a path having a horizontally elongated cross-sectional area and which extends in a helix around a horizontal axis, and a substantially uniform temperature is maintained throughout the mash in its passage through said zone.

2. The method of claim 1, in which said path has two serially connected helical parts leading, respectively, toward and away from the center of said helix.

3. The method of claim 2, in which one of said path parts leads to the center of the helix where the flow direction of the mash is reversed to effect passage of the mash through the other path part leading away from the center of the helix.

4. The method of claim 2, in which one of said path parts leads from the center of the helix to its outer portion where the flow direction of the mash is reversed to effect passage of the mash through the other path part leading to the center of the helix.

5. The method of claim 1, wherein said heating is effected by passing the mash through a first helical path while flowing a heating medium through a second helical path which is separate from but in heat exchange relation to said first helical path.

6. The method of claim 1, which comprises also reheating the mash from said holding zone to a second predetermined temperature and passing the reheated mash through a second holding zone where the mash is directed through a second helical path.

7. The method of claim 1, which comprises also passing the mash from said holding zone through a holding cell and varying the holding time in said cell.

References Cited

UNITED STATES PATENTS 3,082,090 3/1963 Dummett et al. _____ 99—52
1,036,609 8/1912 Grosvenor _____ 23—288 M
2,451,510 10/1948 Pattee _____ 195—21

LIONEL M. SHAPIRO, Primary Examiner

R. B. PENLEND, Assistant Examiner

U.S. Cl. X.R.

99—276; 195—17, 127